Feb. 26, 1957 I. N. STEIGMAN 2,782,677

SYNCHRONIZING ATTACHMENT FOR PICTURE PROJECTORS AND SOUND RECORDERS

Filed Aug. 24, 1954 2 Sheets-Sheet 1

Inventor

Israel N. Steigman

By

Harry Jacobson

Attorney

Inventor
Israel N. Steigman
By
Harry Jacobson
Attorney

United States Patent Office 2,782,677
Patented Feb. 26, 1957

2,782,677

SYNCHRONIZING ATTACHMENT FOR PICTURE PROJECTORS AND SOUND RECORDERS

Israel N. Steigman, Brooklyn, N. Y.

Application August 24, 1954, Serial No. 451,890
8 Claims. (Cl. 88—16.2)

This invention relates to devices for automatically synchronizing projected motion pictures with the sound reproduced from magnetic tape and relates particularly to controls or governors regulating the speed at which the picture film is fed in accordance with the speed at which the tape is fed.

Difficulty has frequently been met in the past in attempts to feed relatively inexpensive unperforated magnetic tape, such as is largely used by amateurs for sound recording and reproduction in apparatus commonly known as "tape recorders," in properly timed relation to the feed of the picture film by the projector therefor during reproduction. During such reproduction variations in the speed of the motor of the projector tend to create, some time after the projection has begun, premature or late reproductior of the sound in relation to the picture.

The present invention therefore contemplates the provision of a device adapted to be quite easily interposed between picture projectors and tape recorders of many of the usual types using inexpensive unperforated tape, which device is responsive to differences between the speed at which the picture film is fed and at which it is taken up, to maintain the ratio of the rate of feed of any selected portion of the tape to the rate of feed of a corresponding portion of the film the same during reproduction as during recording, and to permit said ratio to vary only within narrow limits for different portions of the film and corresponding tape portions. Said device results in synchronizing the film feed with the tape feed within quite narrow limits once the device has been properly adjusted, provision being made for the take up of the film by a reel rotating at the same rotational speed as that of he take up reel for the tape, the rotational speeds of th reels being governed by the linear tape feeding speed w thout danger of overstressing or breaking the film or tape.

The invention further contemplates the provision of means in the form of an attachment to present projectors and tape recorders and dependent on the simultaneous take up of the film and the tape at the same rotational reel speeds, for automatically switching adjustable resistances into and out of a divided circuit to the usual rheostat to the projector, thereby to maintain substantially constant the ratio of the linear speed at which the film is fed to that at which the tape is fed, the tape take up and the film take up being at the same rotational speed sufficient to maintain the tape at the proper tension regardless of the greater rotational speed of the driving pulley on the take up shaft.

The invention further contemplates the provision of means for adequately securing the take up reels for the film and tape in properly related angular adjustment for rotation as a unit thereby to enable the projection of the picture and the reproduction of the sound to be maintained in synchronism, a signal being operative to indicate when the film feed becomes too fast or too slow or stops, or when the film or tape breaks.

The various objects of the invention will be clear from the description which follows and from the drawings, in which.

Figures 1, 2:
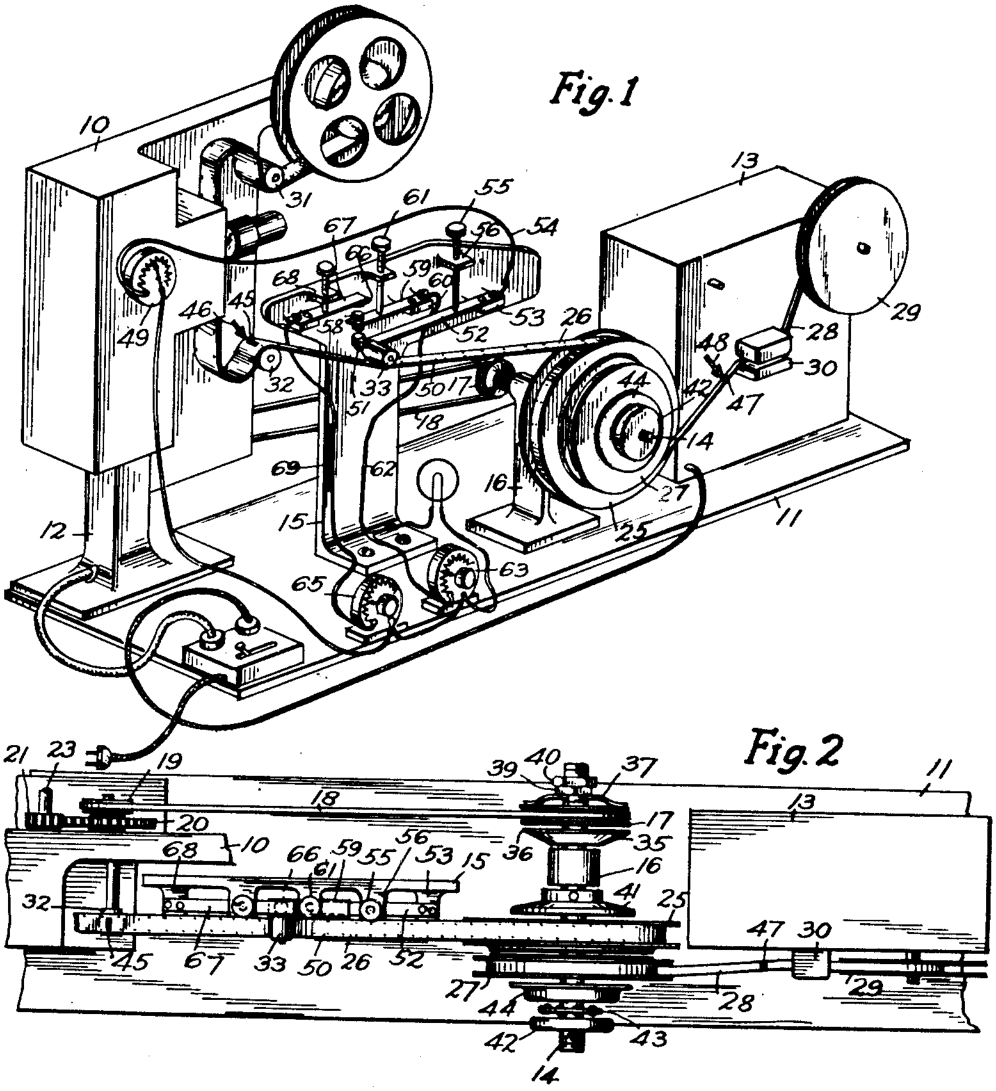
Fig. 1 is a perspective view of the device, showing the attachment interposed between a projector and a tape recorder.
Fig. 2 is a fragmentary top plan view thereof, part of the projector and certain supports being omitted and the slip clutch and the reel clamping means being shown loosened and ready for the initial adjustment thereof.
Figure 3:
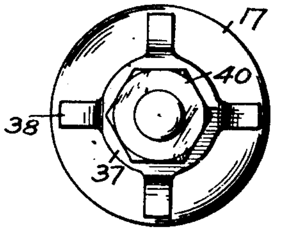
Fig. 3 is an elevational view of the slip clutch at the rear end of the reel carrying shaft.
Figure 4:
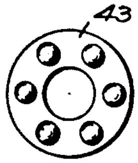
Fig. 4 is a similar view of the anti-friction thrust bearing near the front end of the reel shaft.

In the practical embodiment of the invention shown by way of example, the projector 10 is supported above the base 11 as by the pedestal 12 and in position to project the picture past the tape recorder 13 which is also mounted on said base in sufficient spaced relation to the projector to permit the take-up shaft 14 and the insulating bracket 15 for the speed control means to be interposed therebetween. The shaft 14 is rotatably supported by a suitable bearing bracket 16 upstanding from the base, and loosely carries a driving pulley 17 at the rear end thereof continuously driven by the belt 18. As best seen in Fig. 2, said belt passes around the pulley 19 which is driven through suitable reduction gearing as 20, 21 by the projector motor 22 (Figs. 6–8) or by a separate motor, not shown, for the shaft 23 of the gear 21.

Loosely mounted on the take-up shaft 14 are the separate reels on which the film and tape are respectively wound and taken up during the operation of the apparatus and which are relatively adjustable for initial synchronization of the film and tape. The film take-up reel 25 receives and rewinds the picture film 26 while the tape take-up reel 27 receives and rewinds the preferably unperforated magnetic sound tape 28, which is preferably, though not necessarily, of the relatively inexpensive and easily available ¼ inch width. The tape 28 is fed by the usual feeding means incorporated in tape recorders of standard construction from the tape reel 29 through the sound impressing or reproducing device 30 to the tape take-up reel 27 and such feed of the tape is not altered in any manner by the synchronizing device. Should the tape break or part for any reason at a point before the feeding mechanism therefor, the sound stops when the tape up to said point has been taken up, and the operator's attention is attracted so that the defect may be remedied. Similarly, if the tape parts at a point past the feeding mechanism, no damage can result as the tape merely accumulates outside of and adjacent to the reel 27 until the operator makes the needed correction. The perforated picture film 26 of any of the conventional widths is threaded on and past the usual sprockets 31, 32 and the like of the projector 10 and under the feeler roller 33 then on to the film take-up reel 25.

Figure 5:
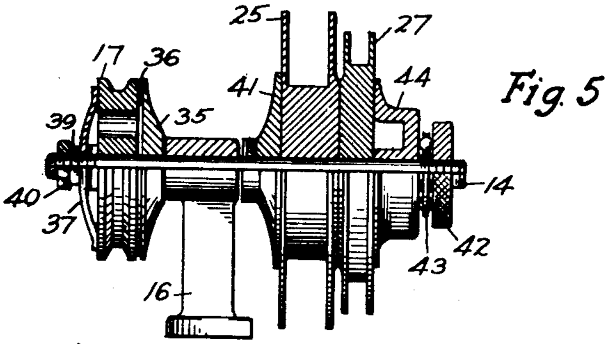
Fig. 5 is a combined elevational and vertical sectional view of the reel shaft and of the parts carried thereby showing the slip clutch tightened and the reel clamped to the shaft.

Since the reels 25 and 27 are loose on the shaft 14, means are provided to connect the reels and the pulley operatively to the shaft so that the shaft rotates only at the rotational speed determined by the linear speed at which the tape 28 is fed by the tape recorder regardless of the speed at which the film is fed, whereby excess pull or take-up tension is never exerted on the tape but the tape is maintained at the proper tension by the tape take-up reel 27. Said connecting means comprises a slip clutch interposed between the pulley and the rear end of the shaft and a pressure clamp for the reels at the front end of the shaft (Figs. 2 and 5). The slip clutch comprises the disc 35 fixed to the shaft and provided with a facing 36 of friction material such as leather or the like on its rear surface. Said facing is engaged by the front face of the pulley with adjustable pressure controlled by the resilient washer 37 loosely mounted on the shaft and having radial arms 38 pressing against the rear face of the facing. Adjusting nuts 39 and 40 hold the washer in place and serve to adjust the pressure with which the pulley and the disc are clamped together. Hence the pulley rotates relatively to the disc and to the shaft when driven at such excessive take-up speed as would tend to rupture the tape or the film.

In operation, the rotational speed of the pulley is not less than that of the shaft.

The clamp connecting the reels to the shaft comprises the clamping disc 41 fixed to the shaft at the rear face of the film take-up reel 25, the clamping wheel 44 loosely mounted at the front part of the shaft and engaging the front face of the tape take-up reel, and the hand nut 42 threaded to the front end of the shaft. An anti-friction thrust bearing 43 of any suitable type is interposed between the nut and the clamping wheel to permit the reels to be clamped between said wheel and the disc to each other and to the shaft for rotation as a unit therewith, and in the exact positions required for simultaneous start of the film and type in synchronism with each other. To indicate the proper starting positions of the tape and film, after the nut 42 has been loosened to free the reels from the shaft and the loose leading end part of the film has been well wound on the film take-up reel, said reel 25 is rotated until the start indication or mark 45 on the leading end part of the film (Fig. 1) is opposite or registers with the fixed arrow 46 on the projector. Similarly, the leading end part of the tape is fixed to the loose tape take-up reel 27 which is rotated until the start indication 47 on the tape registers with the fixed arrow 48 on the tape recorder. In these positions of the film and tape and with the slack therein all taken up, the reels are held manually against rotation while the nut 42 is tightened to clamp the parts together. The bearing 43 permits the nut to be rotated without disturbing the adjusted positions of the reels or pulling tape or film.

It will now be seen that overdrive of the pulley 17 first causes all slack in the tape to be taken up and then causes slippage between the pulley and the shaft 14 under excessive speed of the film feeding motor. To insure sufficient take-up speed, the motor always runs at a speed somewhat in excess of that required for the take up. It will also be seen that the rotational take-up speeds of the film and tape are identical with each other and are controlled by the speed at which the tape is fed by the feeding motor of the tape recorder when the rotational speed of the pulley 17 is equal to or greater than the rotational tape take-up speed.

Should the film feed fail to remain in synchronism with or to equal the film take up and consequently permit the picture and sound to get out of step or become unsynchronized because of variations in the proper ratio of the speeds of the tape and film, the control means or governor hereinbefore mentioned becomes operative to compensate for the change in speed of the film driving motor 22 by feeding more or less current thereto as may be required to restore synchronism. Said control means comprises a divided circuit for the rheostat 49 for the motor 22 in which circuit is arranged an adjustable resistance, a signal lamp and separable contacts responsive to movement of the feeler 33 by the film. As shown in Figs. 1, 6, 7 and 8, said feeler rests normally on the film portion 50 between the sprocket 32 and the film take-up reel 25. The feeler is rotatably supported at the free end of the spring arm 52 carrying the contact point 51. The other end of the arm is secured to the fixed lug 53 projecting from the bracket 15 which is preferably of insulating material such as suitable plastic. The weight of the feeler is sufficient to bend the resilient arm enough to permit the feeler to remain in contact with and to roll on the film as the film is advanced, but said weight is insufficient to maintain such contact under the conditions shown in Fig. 6 wherein the portion 50 is elongated and sags into a relatively deep loop, as when the takeup of the film is slower than the film feed.

The lower contact point 51 is connected by the conductor 54 to that terminal of the usual rheostat 49 for the projector motor 22 which is directly connected to the current supply line 57. The other terminal of the rheostat is connected to the motor 22. To limit the uppermost position of the arm 52, an adjusting screw 55 operates in the lug 56 projecting from the bracket 15, the lower end of the screw engaging the arm. It will be seen that the contact point 51 moves upwardly and downwardly as the tautness of the film portion 50 varies and with the lateral movement of the feeler 33, the upward movement being limited by the screw 55. Similarly, a second or intermediate contact point 58 is carried by and the free end of the spring arm 59 in the path of the lower contact point 51. The bracket lug 60 carries the adjusting screw 61 for the arm 59. The conductor 62 connects the intermediate contact point 58 to the auxiliary resistance or rheostat 63 and to the signal lamp 54 and thence leads back to the motor-connected terminal of the rheostat 49 thereby constituting a branch or divided circuit to the rheostat of the motor. The resistance 63 is thereby connected in parallel to the motor-rheostat circuit when the branch circuit including the points 51 and 58 is closed.

A second auxiliary resistance or rheostat 65 may be interposed in parallel in a second divided circuit or branch when the intermediate contact point 58 is moved upwardly sufficiently under the action of the point 51 to engage the upper contact point 66. Said upper point is adjustably carried at the free end of the spring arm 67, the other end of which is fastened to the bracket lug 68, upward movement of the arm being limited by a suitable adjusting screw. The conductor 69 connects the upper point 66 to the rheostat 65 which is also connected to the lamp 64 and to the motor rheostat 49.

Figures 6, 7, 8:
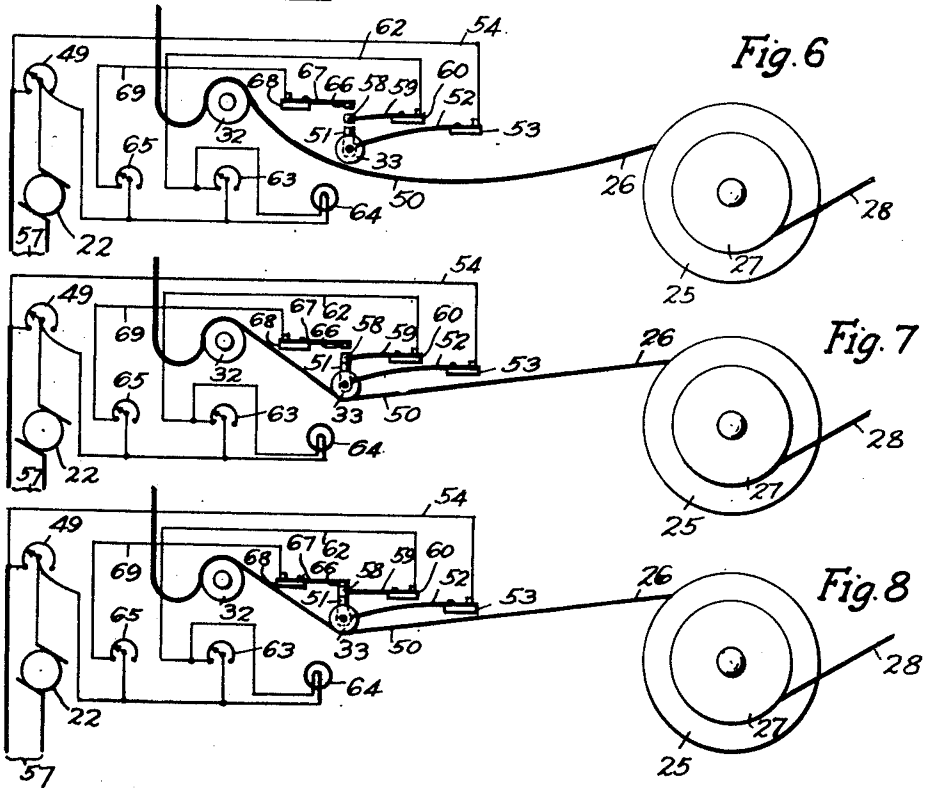
Fig. 6 is a wiring diagram of the control means for the speed of the motor of the projector and a diagrammatical view of the film take-up, showing the dividing circuit for the rheostat of the projector motor open, as in the case when the motor and film speeds are too great or greater than the film take-up speed.
Fig. 7 is a similar view of the same showing the parts in the positions assumed thereby when the motor runs at the proper speed or substantially the same speed as that corresponding to the film take-up and the signal lamp is brightly lighted.
Fig. 8 is a similar view of the same showing the parts in the positions assumed thereby when the motor runs too slowly or at less than the film take-up speed and the signal lamp remains steadily and dimly lighted.

As shown in Fig. 6, should the motor 22 feed the film 26 at too great a speed, that is, at a speed greater than that at which the film is taken up by the reel 25, then the film portion 50 is elongated and sags enough to permit the feeler 33 to drop and to open the circuit between points 51 and 58, thereby cutting out the rheostat 63. If the sag in the film is great enough, the circuit between the points 58 and 66 is also opened, cutting out the rheostat 65 as well. The current flowing to the motor and the motor speed are consequently reduced in an obvious manner.

Fig. 7 illustrates the situation when the film portion 50 is taut enough to bring the points 51 and 58 together and when the film portion is not taut enough to bring the points 58 and 66 together. In that case, the divided circuit to the auxiliary rheostat 63 only is closed, reducing the resistance in the motor circuit, brightly lighting the lamp 64 and increasing the speed of the motor thereby to feed the film fast enough to reduce the tension therein.

When the motor 22 runs much too slow and does not feed the film as fast as it is taken up, the film portion 50 becomes taut enough to raise not only the lower contact point 51 but also to carry the intermediate point 58 against the upper point 66. In that case, the divided circuits to both auxiliary rheostats 63 and 65 are closed increasing the motor speed. The film is thereby fed fast enough to relieve the taut condition of the portion 50 whereby danger of breaking the film is avoided and synchronism of the film and tape feeds is maintained.

Preferably, the contacts are normally separated quite small adjustable distances on the order of about 1/64th to 1/100th of an inch so that the control is extremely sensitive to variations in tautness or slackness of the control portion 50 of the film. The changes in motor speed caused by such variations may be at relatively short intervals at the beginning of the run, that is at a relatively high rate or frequency, but if the rheostats have been properly adjusted at or before the start in the manner soon to be described, the changes in speed occur at longer intervals during the operation or cease altogether and the film is fed at exactly the film take-up speed. This usually occurs in the position of the parts shown in Fig. 7, wherein the lamp 64 burns steadily brightly, but may flicker somewhat or blink on and off. Once the rheostat 49 is set, the operator need only watch for breaks in the film or tape, since the control automatically maintains constant the ratio between the film speed and the tape take-up speed. However, a trial run by the operator for adjustment purposes is usually advisable before the exhibition run takes place. At the beginning of the trial reproduction run, the film and tape ends are wound on the respective reels therefor with the synchronizing indications 45 and 46 for the film coinciding or registering and the indications 47 and 48 for the tape in registration. If the sound is to be recorded by the tape recorder and there is no indication on the tape, then such indication 47 is made when the film is in its initial or starting position, and the same take-up reels or those of the same diameters as are used in recording, are used in reproduction. Current being supplied to the projector and recorder, the signal lamp 64 apprises the operator regarding the required adjustment of the main rheostat 49.

When the lamp is alternately bright and dim, the film is being fed too slowly and the rheotat 49 should be turned to decrease the resistance offered thereby and to speed up the projector motor. When the lamp burns dimly but steadily then the projector is operating at extremely low speed or is stalling. The excessive pull of the too taut film on the take-up reels also slows up and may stall the reels but such stalling merely results in the accumulation of tape between the tape recorder and the reel 27. Turning the rheostat 49 to increase the current supplied to the motor speeds up the motor and the film feed, provides the requisite slack in the film and corrects the situation. When the lamp does not light at all (Fig. 6) the motor speed is excessive and is reduced by turning the rheostat 49 to decrease the motor speed until the lamp does light. Until the correct adjustment is attained, the "hunting" caused by variations in film speed continues but at a lesser frequency according to the adjustment of the contact points by the adjusting screws therefor. The optimum adjustment is that at which the "hunting" occurs at a low frequency or ceases altogether as is shown by the steady bright condition of the signal lamp. Such condition is ideal and may not often be long maintained. Blinking of the lamp from an "out" or unlighted condition to bright, or from bright to dim, is the "hunting" mentioned in the automatic adjustment toward the ideal stable synchronization. The control means having been adjusted as described in the trial run, the exhibition run may proceed.

It will now be seen that I have provided an instantaneous, sensitive control for maintaining constant the ratio of the film speed to the tape and film take-up speeds so as to hold the picture and sound in synchronism, that the control means may readily be adjusted initially and retains its adjustment, that a visible signal indicates whether the control is functioning properly, that the control means does not interfere with the operation of the tape recorder, that low cost unperforated tape may be used in the tape recorder and maintained in synchronism with the projector, that few, if any, changes in standard projectors and tape recorders are required for use with my control as an attachment interposed between the projector and the recorder and that the various objects of the invention have been adequately attained by simple and dependable apparatus.

While certain specific forms of the invention have herein been shown and described, various obvious changes may be made therein without departing from the spirit of the invention defined in the appended claims.

I claim:

1. In picture film and sound tape synchronizing apparatus, film feeding means, feeding means for unperforated tape, a tape take-up reel, a film take-up reel, a common shaft loosely supporting the reels, means for clamping the reels to and unclamping the reels from the shaft for normal rotation of the reels with the shaft and with each other as a unit, an unperforated magnetic sound tape on the tape take-up reel and engaged with the tape feeding means, said tape limiting the rotational speed of the reels to correspond to the feeding speed of the tape, and driving means on the shaft rotatable by the film feeding means at rotational speeds greater than that of the shaft to rotate the shaft at the maximum speed permitted by the tape, and an operative connection between the film feeding means and said driving means on the shaft.

2. The apparatus of claim 1, and means responsive to variations in the speed of the film feeding means to compensate for said variations by correspondingly changing the speed of the film feeding means sufficiently to maintain the ratio of the linear speed of the film to the linear speed of the tape the same during reproduction of the sound as during recording of the sound at corresponding parts of the film and tape when the same take-up reels are used in recording and reproduction.

3. The apparatus of claim 2, the film feeding means including a motor, the compensating means comprising a feeler roller for the film, means yieldingly supporting the roller for movement laterally of the film, a divided circuit to the motor, a rheostat in the circuit and means in the circuit responsive to lateral movement of the roller to close the circuit and speed up the motor and to open the circuit and slow down the motor.

4. The apparatus of claim 2, the film feeding means including a motor, the compensating means comprising a feeler roller for the film, a divided circuit to the motor, a rheostat in the circuit, means in the circuit responsive to movement of the roller to close the circuit and to speed up the motor and to open the circuit and to slow down the motor, and a signal lamp in the rheostat circuit to signal said variations and to burn brightly and steadily to indicate proper functioning of the apparatus.

5. In picture film and sound tape synchronizing means, a film-feeding motor, feeding means for unperforated magnetic sound tape, means interposed between the motor and the tape feeding means to maintain the speed of the motor at a rate just sufficient to take up the tape fed by the tape feeding means, take-up reels for the film and tape, an operative connection to the motor, said connection including a common shaft for and rotatable as a unit with said reels, a pulley loose on the shaft and a slip clutch between the shaft and the pulley, the maximum speed of the shaft being determined by the tape, and the rotational speed of the pulley being not less than that of the shaft, said speed-maintaining means comprising a feeler for the film fed by the film feeding means, the feeler being arranged at a control portion of the film between the motor and the film take-up reel, and means responsive to bodily movement of the feeler by the film to control the speed of the motor comprising a resistance in a divided circuit to the motor and means interposing the resistance into the divided circuit and cutting the resistance out of said circuit.

6. In picture film and sound tape synchronizing apparatus, the combination with a picture projector provided with film feeding means, and a tape recorder provided with means for feeding unperforated magnetic tape, of a take-up shaft, a film take-up reel loose on the shaft, a tape take-up reel for unperforated sound tape loose on the shaft, a drive pulley loose on the shaft, an operative connection between the pulley and the film feeding means to rotate the pulley, a slip clutch interposed between the pulley and the shaft to permit the pulley to rotate relatively to the shaft and normally to connect the pulley to the shaft, means to clamp the reels to the shaft and means responsive to the difference between the linear speed of feeding movement of the film and the linear speed of the take-up movement of the film by the film take-up reel to maintain substantially constant the ratio of the linear feeding speed of the film to the linear feeding speed of the tape at corresponding portions of the film and tape during reproduction of the sound recorded on the tape by said apparatus.

7. Apparatus to vary the film feeding speed of the motor of a projector for perforated motion picture film to correspond to the tape feeding speed of a sound recorder and reproducer for unperforated magnetic sound tape and thereby to maintain the ratio of the rates of linear speeds of the film and tape substantially constant for any selected portion of the film and the corresponding portion of the tape during both recording of the sound on unperforated tape and during reproduction of the sound from the tape, said apparatus comprising a take-up reel for the film, a take-up reel for the tape, the reels being of different effective diameters, a common shaft loosely supporting the reels, means to clamp the reels in angularly adjusted relation to each other and to the shaft for rotation normally as a unit with each other and with the shaft, a drive pulley loose on the shaft, an operative connection between the pulley and the film feeding motor of the projector to drive the pulley normally at a rotational speed not less than that of the shaft, a slip clutch between the pulley and the shaft whereby the rotational speed of the take-up reels and of the shaft is governed and limited by the rate at which the tape is fed to the tape take-up reel from the sound recorder, variations in the speed of the projector motor producing variations in the tautness of a control portion of the film arranged between the projector and the film take-up reel, and means for correcting said variations to maintain the correct ratio between the linear feeds of the film and the tape comprising a bodily movable roller urged against said control portion of the film, a switch operated by the roller and in a divided circuit to the projector motor, and a resistance in said divided circuit arranged to be interposed into said circuit and to be cut out of said circuit on the closing and opening of the switch by the roller.

8. The apparatus of claim 7, and a signal lamp in the divided circuit arranged to burn brightly only when the switch is closed and the correct ratio between the rates of feed of the film and tape is attained.

References Cited in the file of this patent

UNITED STATES PATENTS

| | | |
|---|---|---|
| 1,590,694 | McLaren | June 29, 1926 |
| 1,891,738 | Thomas | Dec. 20, 1932 |
| 1,936,043 | Thomas | Nov. 21, 1933 |
| 1,985,552 | Ross | Dec. 25, 1934 |
| 2,008,881 | Thomas | July 23, 1935 |
| 2,099,987 | Murdock | Nov. 23, 1937 |
| 2,243,112 | Morrissey | May 27, 1941 |

FOREIGN PATENTS

| | | |
|---|---|---|
| 347,026 | Great Britain | Apr. 23, 1931 |